United States Patent
Shiue et al.

(10) Patent No.: US 7,085,123 B2
(45) Date of Patent: Aug. 1, 2006

(54) POWER SUPPLY APPARATUS AND POWER SUPPLY METHOD

(75) Inventors: Lih-Ren Shiue, Hsinchu (TW); Hsing-Chen Chung, Hsinchu (TW)

(73) Assignee: Luxon Energy Devices Corporation, Taipei (TW)

( * ) Notice: Subject to any disclaimer, the term of this patent is extended or adjusted under 35 U.S.C. 154(b) by 0 days.

(21) Appl. No.: 10/905,190

(22) Filed: Dec. 21, 2004

(65) Prior Publication Data

US 2006/0133007 A1   Jun. 22, 2006

(51) Int. Cl.
*H01G 4/00* (2006.01)

(52) U.S. Cl. .................. 361/301.2; 361/302; 361/303; 361/305; 361/306.1; 361/306.3; 320/165; 320/166; 320/167

(58) Field of Classification Search ............ 361/301.2, 361/306.1, 301.1, 306.2, 303–305; 320/165, 320/166, 167; 36/502–504, 508–512
See application file for complete search history.

(56) References Cited

U.S. PATENT DOCUMENTS

| | | | |
|---|---|---|---|
| 4,559,483 A | 12/1985 | Jundt et al. ................ 318/301 |
| 5,146,095 A * | 9/1992 | Tsuchiya et al. .......... 290/38 R |
| 5,157,267 A | 10/1992 | Shirata et al. ............ 290/38 R |
| 5,373,195 A | 12/1994 | De Doncker et al. ......... 307/45 |
| 5,390,073 A * | 2/1995 | McMillan .................... 361/327 |
| 5,642,696 A | 7/1997 | Matsui ..................... 123/179.1 |
| 5,734,258 A | 3/1998 | Esser ......................... 323/224 |
| 5,977,748 A | 11/1999 | Okamura .................... 320/118 |
| 6,016,049 A | 1/2000 | Baughman et al. ......... 320/167 |
| 6,075,331 A | 6/2000 | Ando et al. ................. 318/376 |
| 6,093,982 A | 7/2000 | Kroll .......................... 307/115 |
| 6,373,152 B1 | 4/2002 | Wang et al. ................ 307/150 |
| 6,617,830 B1 | 9/2003 | Nozu et al. ................. 320/166 |
| 6,624,535 B1 * | 9/2003 | Morrow ....................... 307/71 |
| 6,650,091 B1 * | 11/2003 | Shiue et al. ................ 320/166 |
| 6,661,205 B1 | 12/2003 | Muraki et al. .............. 320/166 |

FOREIGN PATENT DOCUMENTS

| | | |
|---|---|---|
| EP | 1 107 420 A2 | 6/2001 |
| EP | 1 363 386 B1 | 1/2005 |
| JP | 05-321798 | 12/1993 |
| WO | WO 98/28672 A2 | 7/1998 |

* cited by examiner

Primary Examiner—Nguyen T. Ha
(74) Attorney, Agent, or Firm—Jiang Chyun IP Office (57) ABSTRACT

A power supply apparatus and a power supply method are described, wherein the non-polar characteristics of the electrodes of a capacitor is utilized to improve the energy utilization efficiency of a battery through reciprocating switches of polarity connection between the battery and the capacitor. The voltages of the capacitors can also stay at a near constant level using the polarity reversal mechanism.

24 Claims, 4 Drawing Sheets

POWER SUPPLY APPARATUS AND POWER SUPPLY METHOD

BACKGROUND OF THE INVENTION

1. Field of the Invention

The present invention relates to power supply equipment. More specifically, the invention relates to a power supply apparatus and a power supply method that use a battery and a capacitor to deliver a stable power output. The power supply apparatus and method are capable of saving energy via reciprocal switches of the polarity connection between the battery and the capacitor.

2. Description of the Related Art

Batteries have become a necessity in modern life, and are used daily in various areas from automobiles to consumer products such as cell phones, laptops and music players. Batteries depend on chemical reactions for energy conversion at charging and discharging, and are normally designed for applications using low powers. Because the chemical reactions of batteries require overcoming some energy barriers, batteries are prevented from fast charging and discharging. Though lead acid batteries are well known by high power densities as they are commonly used to start automobiles, the batteries have short service time for delivering such high currents. Theoretically, all batteries can be imparted a high power density with breakthrough in their materials. In return, the use time and lifetime of the batteries are compromised, and the devices tend to be bulky if they are made to work long.

In comparison, supercapacitors utilize rapid surface adsorption and desorption for energy conversion. When the electrodes of the supercapacitors are energized at charging, ions of the electrolyte enclosed in the devices will be quickly adsorbed at the interface of electrodes and electrolyte. The ions accumulated count for the capacitance of capacitors, or energy stored in the capacitors. When supercapacitors are controlled to discharge, desorption of ions can proceed quickly as well. Hence, supercapacitors have much higher power densities than batteries.

Supercapacitor is also known as ultracapacitor and electric double-layer capacitor. Activated carbon is the most popular adsorptive material for fabricating the supercapacitor. Due to the large surface area of activated carbon, supercapacitors can store several order of magnitude of energy higher than that of conventional capacitors, for example, aluminum electrolytic capacitors. For the convenience of manufacturing, both electrodes of a supercapacitor are frequently made of the same activated carbon in the same formulation and the same preparation process. By design, the two electrodes of a supercapacitor are symmetrical carrying no polarity until the supercapacitor is charged. On the contrary, batteries and conventional capacitors have designated anode and cathode made of different materials. In terms of polarity, the two electrodes of a battery are not interchangeable.

It is when a supercapacitor is connected to a power source for charging that the polarity of its two electrodes is decided. The electrode hooked to the positive pole of the power source will be positively charged and the other electrode negatively charged, indicating that the polarity of the electrodes of a supercapacitor is created through charging. Once a charged supercapacitor releases its stored energy to a load completely, its electrodes resume the non-polar state. In the next charging stage, either electrode, regardless of its polarity induced in the previous charging stage, of the supercapacitor can be connected to the positive or negative pole.

The forgoing switch of electrodes for charging causes no damage to the supercapacitors for the electrodes are symmetrical with the same chemical identity. Such switching of polarity connection is not permitted for batteries or conventional capacitors for the polarity of their electrodes are fixed. If the electrodes of the latter are misconnected, some catastrophe, for example, explosion, may happen.

Supercapacitors can only store energy but cannot generate energy. Thus, supercapacitors belong to the class of passive device, and two shortcomings can be immediately recognized in the use of supercapacitors. One is the short usetime, and the other is the rapid falling of the capacitor voltages at discharging. Actually, the two defects are all related to the low energy content of supercapacitors. To compensate the handicaps of supercapacitors in power applications, they must work under the support of a power source such as batteries, fuel cells, generators or utility power grid. In the forgoing combination, the unique properties of high power density and fast charging of supercapacitors are fully utilized, and the power level of the power source is significantly amplified. In other words, supercapacitors serve as a load leveling to the aforementioned voltage sources to prolong their lifetime, and to minimize their sizes for the applications.

There are numerous works, particularly in the electric vehicles, using the combination of supercapacitors and batteries as seen in U.S. Pat. No. 5,157,267 issued to Shirata, U.S. Pat. No. 5,373,195 to De Doncker, U.S. Pat. No. 5,642,696 to Matsui, U.S. Pat. No. 5,734,258 to Esser and U.S. Pat. No. 6,617,830 to Nozu, just to name a few. In these prior reports, a plural number of batteries and supercapacitors are grouped into two separate banks, respectively, disposed with electronic circuits containing converters and processors to control the power delivery and recharging of supercapacitors.

Combinatory use of batteries and supercapacitors is also seen in the application of lower power consumption as in U.S. Pat. No. 6,373,152 issued to Wang for power tool. Furthermore, the hybrid of batteries and supercapacitors in conjunction with a switching mechanism for doubling the power output of the hybrid can be found in U.S. Pat. No. 6,016,049 ('049) issued to Baughman and U.S. Pat. No. 6,650,091 ('091) to Shiue. In '049, the battery and supercapacitor are switched from parallel to series connection right before the discharging to a load, whereas only the supercapacitors are switched from parallel to series connection in '091.

All of the prior works using the hybrid power source rely on a bank of batteries for recharging the supercapacitors quickly so that the supercapacitors can provide continuous and stable peak powers. However, the voltages of the supercapacitors fall rapidly at discharging. On the other hand, in many household products driven by disposable or primary alkaline batteries, the end of the battery life does not mean a complete drainage of the energy content of the batteries. As a mater of fact, there is about 65% of energy unused at the time of discarding the batteries because the residual voltages of batteries have fallen below the driving voltages of the products. Therefore, a lot of energy is wasted every time when an alkaline battery is claimed dead.

SUMMARY OF THE INVENTION

As mentioned above, supercapacitor is an effective power-amplifier for either DC or AC power source. Besides the unique properties of high charge and discharge efficiency, long lifetime, as well as the high power density of supercapacitors, this invention can also utilize the symmetric configuration of two electrodes of supercapacitors to increase the performance of the same.

In view of the foregoing, the present invention provides a power supply method using the non-polar characteristics of symmetric capacitors to expand the application scope of hybrid power sources consisting of batteries and supercapacitors.

This invention also provides a power supply apparatus that uses the power supply method of this invention.

In the power supply method of this invention, the polarity of the electrodes of the capacitor is reversed repeatedly in the charging-discharging cycles to improve the energy-utilization efficiency of the batteries and to stabilize the output voltages of the capacitors during discharging.

The power supply apparatus includes at least one voltage source, at least one capacitor connected with the voltage source in series, and at least one switching mechanism connected between the voltage source and the capacitor. The switching mechanism is capable of reciprocally switching the polarity connection between the voltage source and the capacitor.

In one embodiment of this invention, as long as the voltage of the supercapacitor is lower than that of a directly connected able battery, the supercapacitor receives energy from the battery. After the supercapacitor is charged to the potential of the battery, it becomes an open circuit and the battery will stop discharging. By switching the switch disposed at the supercapacitor side, the polarity connection thereof to the battery is reversed. Subsequently, the supercapacitor and the battery are made in series to jointly drive a load at their combined voltages. As the supercapacitor begins discharging and its voltage falls below that of battery, it is recharged by the battery in the reversed polarity. The reverse charging rate is determined by the potential difference between the supercapacitor and the battery.

Upon complete charging of the supercapacitor, the discharge of the battery is cut off again, and then the polarity connection of the supercapacitor to the battery is switched back for the combined power of supercapacitor and battery to continuously drive the load. By using the reverse polarity charging and reciprocating switches of polarity connection of the hybrid power source including a supercapacitor and a battery, the load can be driven incessantly till the battery reaching its final nominal voltage.

Another way to reverse the polarity connection of supercapacitor to battery is by disposing the switching mechanism at the battery side. Whenever the connecting poles of the battery are switched, the polarity connection of the supercapacitor is reversed and the two devices will be in series to drive a load collectively. However, in this arrangement the load will be in a back-and-forth motion as a switching is made. Actually, the polarity connection reversal of the supercapacitor is a switching of the supercapacitor and battery from previous connection state to reversed series connection. While the charging of the supercapacitor by the battery is proceeded via the previous configuration, the switching is to place the two devices in series connection to drive the load at their combined voltages. The connection switching is designed as a safety mechanism with added advantage of fast charging supercapacitor in the third embodiment of the present invention.

In all three implementations, the power provided by the hybrid power source consisting of a supercapacitor and a battery initially comes from the supercapacitor because of its higher discharging rate. When the energy of the supercapacitor is depleted, the battery then succeeds the energy provision to the load. Thus, the battery has a moment of relaxation in the combinatory use with the supercapacitor. It is due to the forgoing rest that the battery in the hybrid pack can regain its voltage in comparison to no voltage rebound of the all-battery counterpart. In other words, with the load leveling of the supercapacitor, the battery can avoid over-discharging that often causes premature decay of voltages resulting in energy loss. Therefore, the energy-utilization efficiency of the battery is improved from momentary relaxation, while the discharging voltage of the supercapacitor may remain at a constant level from the sustainable charging of the battery and the reciprocating polarity reversal.

None of the references cited above and none of other power applications of supercapacitors in the literature have ever put reciprocating switches of the polarity connection of supercapacitors to a charging source into an advantageous use. Through the reciprocating switches of polarity connection using simpler circuits, a steady power output from the supercapacitor can be attained. That is, one of the shortcomings of supercapacitors, i.e., the rapid falling of voltage at discharging, can be rectified with the reciprocating switches. Meanwhile, the energy-utilization of batteries, whether they are disposable or rechargeable (secondary) batteries, can be improved by using supercapacitors in conjunction with the reciprocating polarity reversal as disclosed in the present invention.

It is to be understood that both the foregoing general description and the following detailed description are exemplary, and are intended to provide further explanation of the invention as claimed.

DESCRIPTION OF THE PREFERRED
EMBODIMENTS

Both supercapacitor and battery are energy storage devices, but a battery can contain much more energy than a supercapacitor does. In a hybrid power source consisting of a supercapacitor and a battery, the battery is the power source of the supercapacitor, and together they can work more forcefully than the battery alone.

Figure 1:
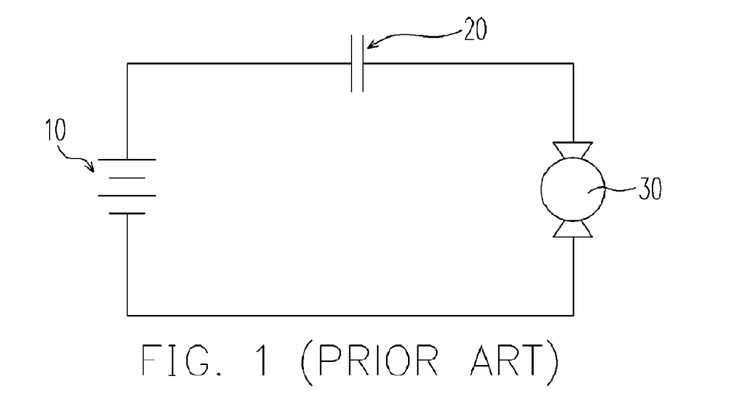
FIG. 1 is a circuit diagram of a working circuit of battery with a supercapacitor disposed therein.

FIG. 1 is a circuit diagram of a working circuit of battery with a supercapacitor disposed therein, wherein the supercapacitor 20 is graphically represented by a pair of equal-length parallel bars to symbolize the non-polar and symmetric state of the electrodes. The supercapacitor 20 is incorporated in a circuit of a battery 10 and a load 30, which may be a motor or a light bulb. With the battery 10 driving the load 30, the empty supercapacitor 20 will be charged by the battery 10 at the same time. Eventually, the supercapacitor 20 will be charged to the voltage of the battery 10, and that is the end of charging as the supercapacitor 20 becomes an open circuit. When the supercapacitor 20 is open, not only the supercapacitor 20 and the battery 10 have the same potential but also they are in parallel connection. As the electrodes of the supercapacitor 20 are polarized from the charging, they bear the same polarity of the two poles of the battery 10 connected to the supercapacitor 20. Electronically, the supercapacitor 20 is in a negative potential state negating the potential of the battery 10, so that the load 30 is stalled.

First Embodiment

Figure 2:
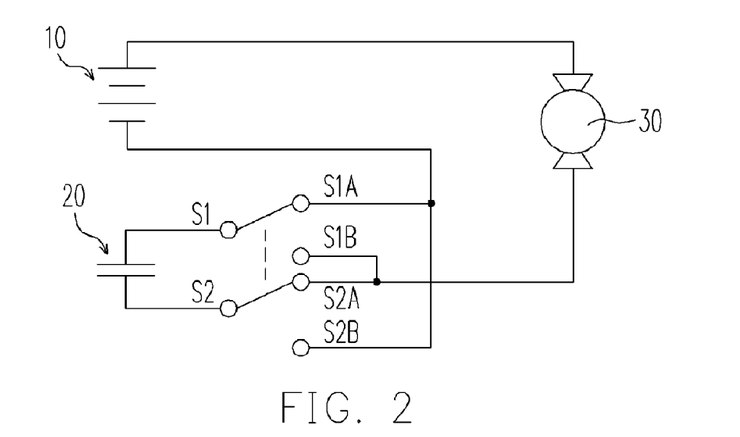
FIG. 2 shows a circuit diagram of a switching mechanism for reciprocating reversal of the polarity connection of supercapacitor to battery according to a first embodiment of this invention.

FIG. 2 illustrates the first embodiment of this invention wherein the polarity connection of the supercapacitor 20 to the battery 10 is controlled by a double-pole, double-throw (DPDT) controller consisting of two switches. With DPDT at the state of S1–S1A and S2–S2A as shown in FIG. 2, the supercapacitor 20 will be charged by the battery 10 at the same time while the load 30 is driven by the battery 10. Even under the situation that the voltage of the battery 10 is insufficient to drive the load 30, a charging current can still pass the load 30 to charge the supercapacitor 20. The flow path of charging current is as follows: the positive pole (longer bar) of the battery 10, the load 30, S2A, S2, the supercapacitor 20, S1, S1A, and then the negative pole (shorter bar) of the battery 10. As soon as the supercapacitor 20 is charged to the potential of the battery 10, the charging current stops flowing and the load 30 will be stalled.

Subsequently, by switching the DPDT to the state of S1–S1B and S2–S2B, the supercapacitor 20 is in series connection with the battery 10 so that their voltages are combined to drive the load 30. If the potential of the battery 10 is 1.5V, the hybrid power source can drive the load 30 at 3.0V. Initially, the driving power is provided by the supercapacitor 20 until the combined voltage falls to 1.5V, and then the battery 10 assumes the power delivery to the load 30. Hence, the battery 10 has a moment of rest while the supercapacitor 20 is in action. When the supercapacitor 20 and the battery 10 are directly connected, the battery 10 will charge the supercapacitor 20 so long as the supercapacitor 20 is lower in potential than the battery 10. Thus, as the supercapacitor 20 discharges, the lost energy thereof is compensated by the battery 10 to maintain a potential equalization between them.

The charging rate is proportional to the potential difference between the supercapacitor 20 and the battery 10, and the charging is completed at the end of the decay of the combined voltages of the supercapacitor 20 and the battery 10. The charging route is as follows: the positive pole (longer bar) of the battery 10, the load 30, S1B, S1, the supercapacitor 20, S2, S2B and the negative pole (shorter bar) of the battery 10. Therefore, an electric field is being built across the electrodes of the supercapacitor 20 in opposite polarity even the polarity reversal is made in the middle of a discharging stage of the supercapacitor 20. In this case, the supercapacitor 20 is charged in reverse polarity. Because of the symmetric nature of the electrodes of the supercapacitor 20, the reverse polarity charging is permitted.

Furthermore, the charging and discharging of the supercapacitor 20 are two reversible physical processes, that is, ion-adsorption and ion-desorption on the surface of electrodes. As soon as the ions are desorbed, vacant sites become available for adsorption. If the ions can be desorbed at a fast speed to meet a large power demand of the load 30, the supercapacitor 20 can be accordingly recharged in a short time. As the supercapacitor 20 is recharged to the negative potential of the battery 10, the polarity connection between the supercapacitor 20 and the battery 10 must be reversed again for using the energy newly stored in the supercapacitor 20 to drive the load 30 at a new combinatory voltage of the supercapacitor 20 and the battery 10. Without the reversal of polarity connection, the load 30 receives no driving force from the supercapacitor 20 or the battery 10. The foregoing operation of reciprocating switches of the polarity connection of the supercapacitor 20 to the battery 10 can be repeated till the combined voltage of the supercapacitor 20 and the battery 10 is below the driving voltage of the load 30.

There are two means for deciding when to switch the polarity connection of supercapacitor to a voltage source. One of them is according to the discharge time of the supercapacitor, that is, according to a certain period of time for the supercapacitor to discharge before switching. The other is according to the residual voltage of the supercapacitor, while in this case a voltage sensor is required to trigger the switching at a predetermined potential. As a matter of fact, the discharging time and the residual voltage are related to the same discharging process, and a longer discharging time results in a lower residual voltage.

In any event, the polarity connection of the supercapacitor to a charging source can be reversed at a selected point according to the application need. The reciprocating switches of polarity connection can be meticulously designed to allow the discharge voltage of the supercapacitor to maintain at a desired potential level. Comparing with the conventional discharging step of supercapacitor wherein the discharge voltage of the supercapacitor rapidly drops to zero, the reciprocating switches can advantageously impart supercapacitor discharging at a stable voltage. As a result, the supercapacitor can perform like a battery on showing a steady and slow decline of voltage at discharging. A slow decay of working voltage at discharging is crucial to the effective use of both battery and supercapacitor.

When the charging source of the supercapacitor is a bank of batteries, fuel cells, combustion engines, turbo-generators, or utility power grid with abundant energy content, the reciprocating switches can quickly charge the supercapacitor to the full capacity so that the supercapacitor is always ready for a real-time and consistent provision of peak powers to any load without delay. In return, the charging source will have no danger of overloading and thus no fire hazard, plus the size and cost of the voltage source can be reduced in comparison with the counterpart without a supercapacitor and reciprocating switching on driving the same load.

There is one more benefit to batteries, regardless they are primary or secondary batteries, that the efficiency of energy utilization of the batteries can be significantly improved due to the momentary relaxation in the reciprocating switches. During the relaxation, the batteries may regain their voltages from the re-distribution of active materials stored in various sites of the electrodes. Otherwise, the batteries may suffer premature and irreversible voltage decay because of continuous discharging. Therefore, the operation of reciprocating switches not only can save energy, but also can reduce the number of batteries discarded in the world.

In addition, switching of the polarity connection of supercapacitor to a charging or voltage source may be conducted through mechanical switches, electromagnetic relays, field effect transistors (FETs), integrated bipolar transistors (IGBTs) or intelligent integrated electronic circuit (IIEC). By using a switching trigger, for example, a timer or a voltage detector, in conjunction with electromagnetic relays, FETs or IGBTs, the operation of reciprocating switches can be automatic and the constituted switching control may consume a minimal amount of energy. In addition, an intelligent integrated electronic circuit (IIEC) can sense the voltage and the current of the supercapacitor to trigger the switches in the IIEC accordingly.

Second Embodiment

Figure 3:
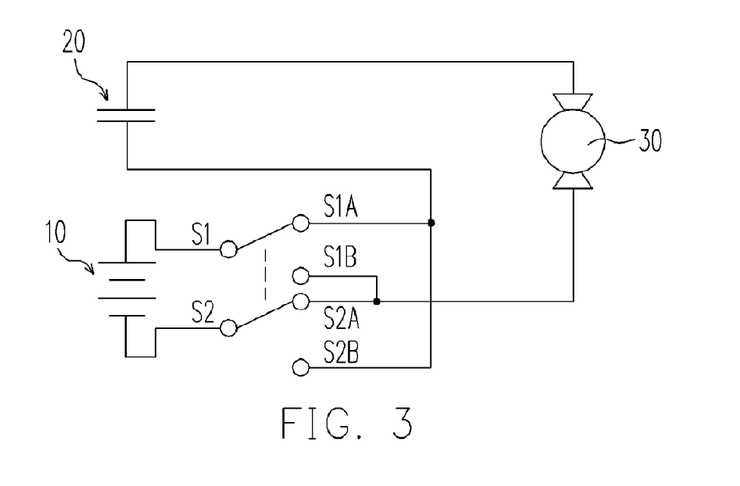
FIG. 3 shows a circuit diagram of a switching mechanism for reciprocating reversal of the polarity connection between the battery and the supercapacitor according to a second embodiment of this invention.

FIG. 3 shows the second embodiment of the present invention on using the reciprocating switches for a load 30 moving bi-directionally, for example, a garage door, an electric curtain or an elevator. With the DPDT is set at the state as shown in FIG. 3, the battery 10 provides a current that flows as follows: the positive pole (longer bar) of the battery 10, S1, S1A, the supercapacitor 20, the load 30, S2A, S2 and the negative pole (shorter bar) of the battery 10. The current may drive the load 30, but will definitely charge the supercapacitor 20 so long as the supercapacitor 20 has a lower potential than the battery 10. When the supercapacitor 20 is charged to the negative potential of the battery 10, the current flow will cease and the load 30 will be stalled.

Alternatively, the discharging of the battery 10 can be synchronized with the movements of the load 30, that is, the battery 10 terminates discharging when the load 30 stops. In the case that the driving force of the battery 10 is negated by the supercapacitor 20, the polarity connection between the battery 10 and the supercapacitor 20 must be reversed to drive the load 30. The battery 10 and the supercapacitor 20 will be in series connection as the DPDT is switched to the state of S1–S1B and S2–S2B. After the switching, the battery 10 and the supercapacitor 20 provides a current in the following flow path: the positive pole (longer bar) of the battery 10, S1, S1B, the load 30, the supercapacitor 20, S2B, S2 and the negative pole (shorter bar) of the battery 10. Meanwhile, the load 30 will moves in the opposite direction by the combined voltage of the battery 10 and the supercapacitor 20.

Once the supercapacitor 20 is charged again to the negative potential of the battery 10, the reversal of polarity connection has to be repeated so that the battery 10 and the supercapacitor 20 together can continuously drive the load 30 until the battery 10 is exhausted. In the other case where the discharging of the battery 10 is synchronous with the movement of the load 30, whenever the load 30 stops at any point between its two traveling ends, the discharging of the battery 10 together with the recharging of the supercapacitor 20 are terminated. Depending on the power consumption of the load 30, the supercapacitor 20 may or may not be fully recharged at the stop. Every time when the supercapacitor 20 is fully recharged, the driving force of the battery 10 is locked and the polarity connection between the supercapacitor 20 and the battery 10 must be reversed for the hybrid power to drive the load 30.

Nevertheless, with the switching scheme as shown in FIG. 3, the load 30 can only move in the opposite direction rather than continuing the prior motion before the polarity reversal. In order to make the load 30 move in the direction the operator wishes, the current provided by the hybrid power source consisting of the battery 10 and the supercapacitor 20 requires rectification by an inverter that can be made via another set of switches.

Third Embodiment

Figure 4:
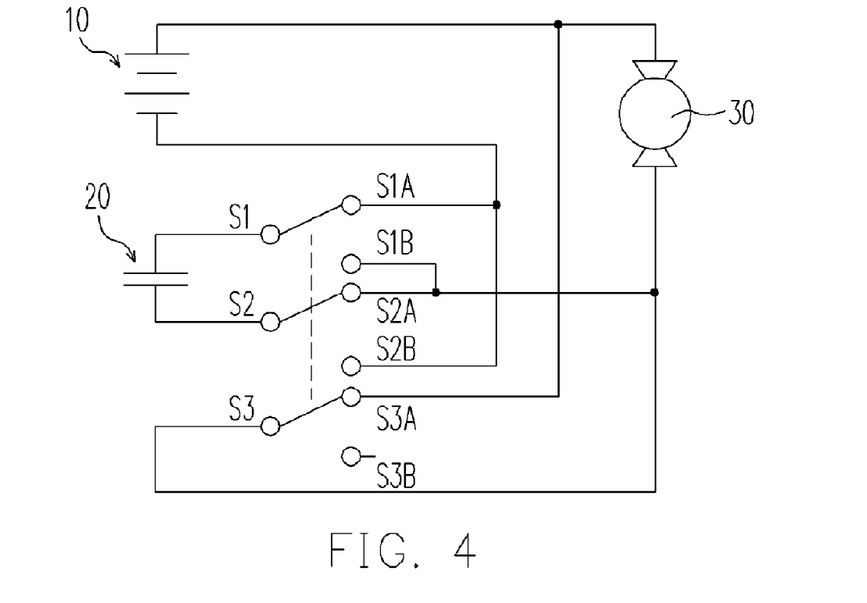
FIG. 4 shows a circuit diagram of a switching mechanism that provides quick charging for the supercapacitor bypassing the load according to a third embodiment of this invention.

FIG. 4 shows the third embodiment of the present invention wherein the battery 10 quickly charges the supercapacitor 20 without passing the load 30. A trigger with three pole double throw (TPDT) consisting of three switches, wherein S1, S2 and S3 are common contacts, is employed for reversing the polarity connection between the supercapacitor 20 and the battery 10. As the TPDT is at the normally closed state (S1–S1A, S2–S2A and S3–S3A) as shown in FIG. 4, the battery 10 will charge the supercapacitor 20 by the following route: the positive pole (longer bar) of the battery 10, S3A, S3, S2A, S2, the supercapacitor 20, S1, S1A and the negative pole (shorter bar) of the battery 10. A push-latching button (not shown) can be used to initiate the charging of the supercapacitor 20.

Since the charging current does not flow through the load 30, the load 30 is stationary. Moreover, as the battery 10 and the supercapacitor 20 are essentially in an electric-short state, the battery 10 can quickly charge the supercapacitor 20. When the trigger is pulled, the TPDT will be slid to the normally open state of S1–S1B, S2–S2B and S3–S3B, and then the battery 10 and the supercapacitor 20 are in series to deliver a high-power pulse for driving the load 30. At the normally open state, the current flow path is as follows: the positive pole (longer bar) of the battery 10, the load 30, S1B, S1, the supercapacitor 20, S2, S2B and the negative pole of the battery 10 (shorter bar). Thereby, the load 30 is energized to impart a sudden strike to an object using the combined power of the battery 10 and the supercapacitor 20.

The foregoing reversal of polarity connection between the battery 10 and the supercapacitor 20 may be applied to various power tools, such as, cordless breaker, compactor, drill, hammer, hedger, nailer, nibbler, pinner, pruner, stapler, tacker, and trimmer, etc. Once the trigger is released, with TPDT returning to the normally closed state, the load 30 will be rested and the supercapacitor 20 will be quickly recharged by the battery 10 and become ready for the next firing. Functionally, the switch S3 of FIG. 4 serves as a safety switch in providing the supercapacitor 20 the quick charging and preventing the load 30 from accidental firing.

According to the above embodiments, the present invention provides a simple, economic and easy-to-use implementation of connection-polarity reversal between a supercapacitor and a charging source for a real-time utilization of the supercapacitor, and the supercapacitor may behave as a battery on delivering a stable and lasting discharge current.

The following examples are provided merely to demonstrate, rather than limiting, the scope of the present invention on stabilizing the working voltage of supercapacitors at discharging and on improving the energy-utilization efficiency of batteries.

Example 1

Using the arrangement as shown in FIG. 2, an alkaline AA-size (or #3) battery of 1.5V is connected to a homemade AA-size supercapacitor (S/C) rated as 2.5V×3 F and a DC motor used for toy cars. In the comparative example, the same DC motor is driven by two pieces of 1.5V alkaline AA batteries of the same brand in series. Thereby, the DC motor is driven either by the combination of battery/supercapacitor and reciprocating switches, or by batteries only. The utilization of battery in either case is compared on driving the motor to depletion of the batteries. The depletion of a battery is defined as a condition that the battery is unable to drive the motor in a non-stop discharging test. Though the battery may be able to drive the motor after overnight rest, the re-use time is short and not included in the test.

Figure 5A:
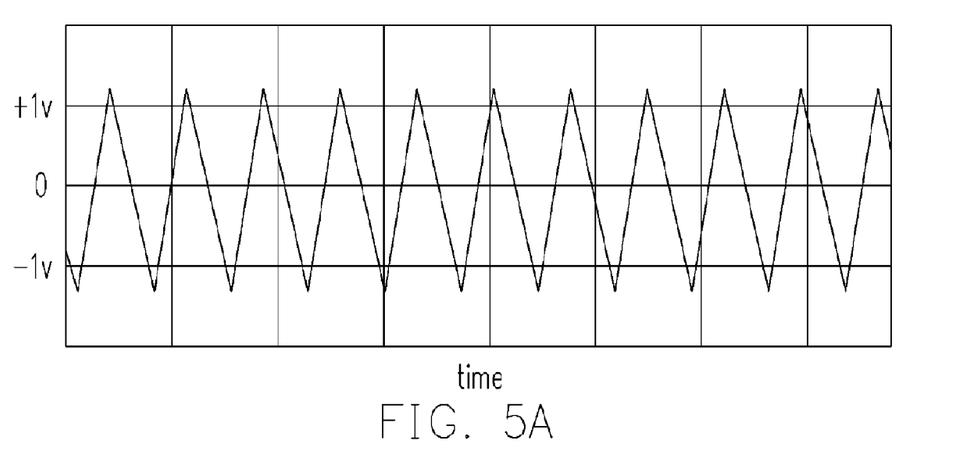
FIG. 5A shows the voltage oscillation of a hybrid power source measured across the supercapacitor using the reciprocating switches operation in Example 1 of this invention.

FIG. 5A shows many cycles of the voltage variation of the hybrid power source measured across the S/C. Battery is known to suffer an immediate voltage drop once it starts discharging. The voltage drop is proportional to the internal resistance of the battery and the power demand of the load. In the present test, the drop is about 0.3V, while the motor consumes a maximum current of 0.5 A. Due to the reciprocating switches, the working voltage of the S/C swings in a potential window of about 2.4V. That is, the S/C can be charged to either 1.2V or –1.2V. Every time when the S/C is discharged from 1.2V to 0V, the supercapacitor will be subsequently recharged from 0V to –1.2V in the reverse polarity. Then, the S/C is discharged from –1.2V to 0V, and from there it is recharged back to 1.2V. Thus, every cycle contains 2 pairs of charging and discharging steps between 1.2V and –1.2V. The reciprocating switches prevent the discharge of the S/C from decaying and locking at 0V as in the conventional application of S/C without reverse polarity charging. Moreover, the nominal discharging voltage of the S/C can be set at a selected potential level by adjusting the switching time.

Figure 5B:
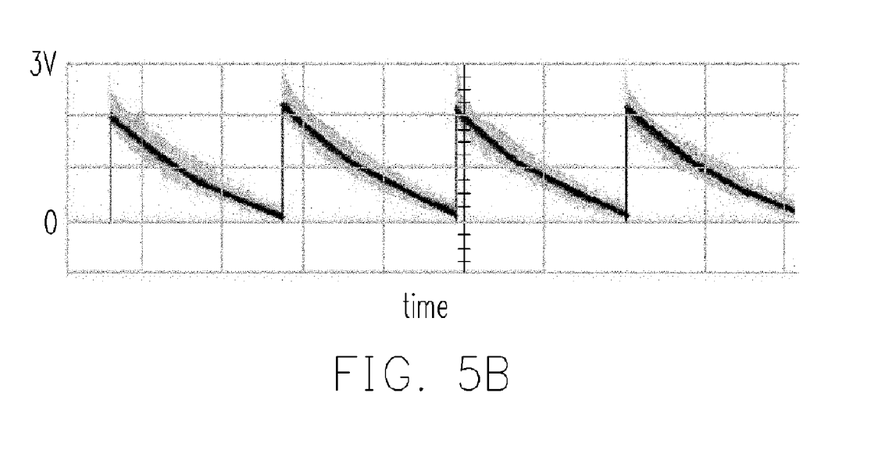
FIG. 5B shows the discharging curve measured across a motor driven by the combined voltage of the battery and the supercapacitor using the reciprocating switches operation in Example 1 of this invention.

FIG. 5B shows several cycles of the voltage decay measured across the motor that is driven by the alkaline battery and the S/C. As a matter of fact, FIG. 5B is the discharge curve of the hybrid power source consisting of the battery and the S/C, wherein the spiny lines are due to interference from the motor. As depicted in FIG. 5B, the hybrid power decays from about 2.5V, instead of 3V, to 0V. At the initial discharging of the hybrid, the power delivered to the motor comes from the S/C and its energy is consumed around 1.2V. Then, the battery succeeds the power delivery to drive the motor and to charge the S/C until the combined voltage becomes zero. When 0V is reached, the S/C is charged fully and negatively. Nevertheless, the motor is running on the inertia. In a matter of seconds, the polarity connection between the S/C and the battery is reversed automatically, and the two collectively drive the motor again in another cycle.

Through the reciprocating switches, the motor is repeatedly driven by the hybrid pack of battery and the flip-flop S/C. Although FIG. 5B shows that the combined voltage dropped to 0V periodically, the inverting point can be set at a voltage that imparts the load an adequate force such as momentum, ignition, acceleration, actuation, torque, impetus, amplitude, or luminosity. Especially, when the battery or other voltage source contains ample energy, the S/C can be quickly refilled and the load will be driven constantly without any sign of sluggishness. In reality, the S/C for assisting battery to drive a load as the motor of a toy car may only require a capacitance of 0.5 F for the motor running persistently.

Figure 5C:
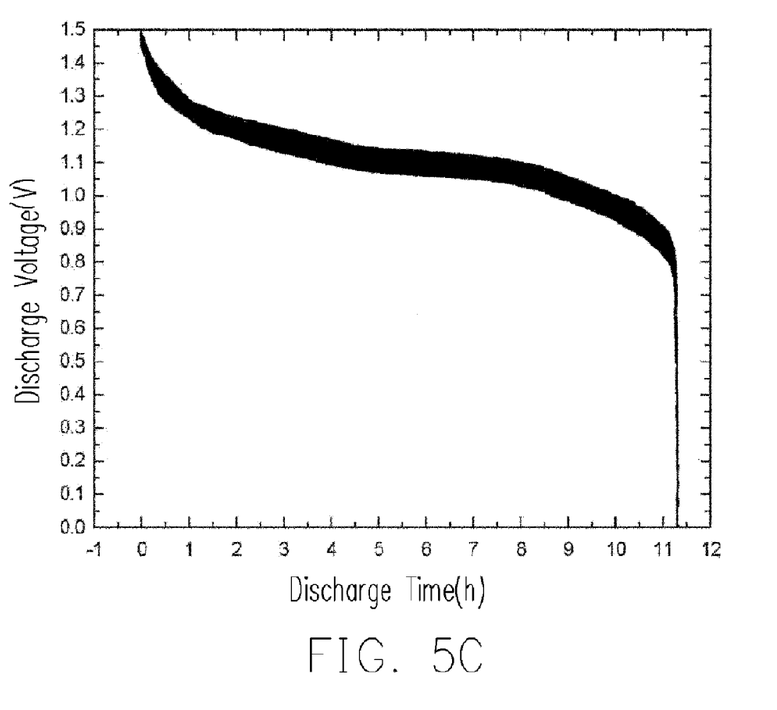
FIG. 5C shows the discharging curve of the battery working together with the supercapacitor in Example 1 of this invention.
Figure 5D:
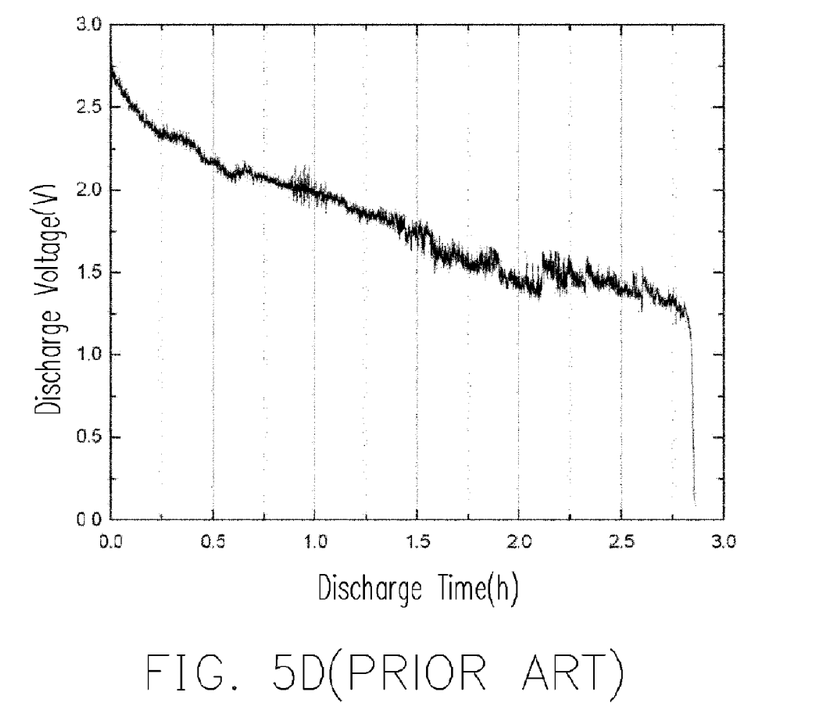
FIG. 5D shows the discharging curve of two batteries connected in series for driving a motor in a comparative example.

FIG. 5C shows the discharge curve of the battery working with the S/C in providing non-stop propulsion to the motor. As seen from the figure, the voltage of battery declines in a flat and slow descent to 0.7V in about 11 hours. In comparison, the discharge curve of the same test using 2 pieces of 1.5V alkaline batteries connected in series is shown in FIG. 5D. The voltage of the two-battery pack decays rather quickly to 1.4V in almost 3 hours. Averagely, each battery has an end voltage of 0.7V same as the battery of the hybrid power source. It appears that whenever the voltage of an alkaline battery falls to 0.7V, its electrochemical reaction can no longer generate sufficient current for working.

In the case that only batteries are used, the motor runs at a progressively decreasing speed. In the other case, the motor periodically shows noticeable deceleration as the voltage of the hybrid power source approaches zero, and the battery of the hybrid pack performs dual functions by providing energy to both the motor and the S/C. The use-time difference between the batteries in the present test may not be as large as seen here, however, with all aspects considered, the reciprocating switches operation significantly improves the energy-utilization efficiency of the battery supported by the S/C. Even at merely 10% extension of the battery use time, the reduction in environmental impact is still profound considering the multi million pieces of battery used annually in the world.

As known to those skilled in the art, S/C provides load-leveling effect to battery, particularly, when the load demands power higher than the designed capability of battery. In this invention, however, the S/C also imparts momentary relaxation to the battery using the reciprocating reversal of polarity connection. Therefore, the battery can regain its voltage, and the use time of the battery is prolonged.

Example 2

The testing conditions are similar to those of Example 1, except that AA-size Ni-MH batteries of 1800 mAh capacity are used instead of the AA-size alkaline batteries. The hybrid pack consisting of the battery and the S/C is operated under reciprocating reversal of their polarity connection every 7 seconds, while the battery-only pack consisting of 2 pieces of Ni-MH batteries connected in series is also used to drive the same motor, until no energy is left to run the motor. The use-times of the hybrid pack and the battery-only one are 6.8 hours and 4.2 hours, respectively. Obviously, the reciprocating reversal of polarity has extended the use-time of the Ni-MH battery.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A power supply apparatus, comprising:
    at least one voltage source;
    at least one capacitor, connected with the voltage source in series,
    wherein a plurality of electrodes of the capacitor are non-polar, the capacitor allows for reverse charging, an electrode polarity of the capacitor is reversed, and a supercapacitor serve as continuous load leveling to the voltage source; and
    at least one switching mechanism connected between the voltage source and the capacitor, capable of reciprocally switching the polarity connection between the voltage source and the capacitor.

2. The power supply apparatus of claim 1, wherein the switching mechanism is disposed at side of the voltage source.

3. The power supply apparatus of claim 2, wherein the switching mechanism comprises a double-pole double-throw (DPDT) switch.

4. The power supply apparatus of claim 1, wherein the switching mechanism is disposed at side of the capacitor.

5. The power supply apparatus of claim 4, wherein the switching mechanism comprises a double-pole double-throw (DPDT) switch.

6. The power supply apparatus of claim 1, further comprising a bypassing mechanism that is in parallel connection with a load of the power supply apparatus in a charging stage of the battery to the capacitor.

7. The power supply apparatus of claim 6, wherein the switching mechanism comprises a three-pole double-throw (TPDT) switch that also switches the bypassing mechanism.

8. The power supply apparatus of claim 1, wherein the voltage source is selected from the group consisting of primary batteries, secondary batteries, fuel cells, combustion engines, turbo-generators and utility power grid.

9. The power supply apparatus of claim 1, wherein the capacitor is selected from the group consisting of supercapacitor, ultracapacitor and electric double layer capacitor.

10. The power supply apparatus of claim 9, wherein the capacitor has a working voltage of 1.5V or above and a capacitance of 0.5 F or above.

11. The power supply apparatus of claim 1, wherein the capacitor has two electrodes for connecting to the voltage source, and the electrodes are identical in chemical composition.

12. The power supply apparatus of claim 1, wherein the switching mechanism is selected from the group consisting of mechanical switch, electromagnetic relay, field effect transistor (FET), integrated bipolar transistors (IGBTs) and intelligent integrated electronic circuit (IIEC).

13. The power supply apparatus of claim 12, wherein the switching mechanism has a switching time of 60 seconds or shorter.

14. The power supply apparatus of claim 12, wherein the intelligent integrated electronic circuit (IIEC) can sense voltage and current of the capacitor to trigger switches in the IIEC accordingly.

15. A power supply method that is applied to a power supply system including at least one voltage source and at least one capacitor wherein a plurality of electrodes of the capacitor are non-polar, the capacitor allows for reverse charging, an electrode polarity of the capacitor is reversed, and a supercapacitor serve as continuous load leveling to the voltage source, comprising:
 connecting the voltage source and the capacitor in series; and
 reciprocally switching the polarity connection between the voltage source and the capacitor by using a switching mechanism connected between the voltage source and the capacitor.

16. The power supply method of claim 15, wherein the switching of the polarity connection is performed every time a combined voltage of the voltage source and the capacitor is substantially zero.

17. The power supply method of claim 15, wherein the step of reciprocally switching the polarity connection comprising: changing the polarity connection state between the voltage source and the switching mechanism.

18. The power supply method of claim 17, wherein the switching mechanism comprises a double-pole double-throw (DPDT) switch.

19. The power supply method of claim 15, wherein the step of reciprocally switching the polarity connection comprising: changing the polarity connection state between the capacitor and the switching mechanism.

20. The power supply method of claim 19, wherein the switching mechanism comprises a double-pole double-throw (DPDT) switch.

21. The power supply method of claim 15, further comprising:
 using a bypassing mechanism to bypass a load of the power supply system in a charging stage of the capacitor.

22. The power supply method of claim 21, wherein the switching mechanism comprises a three-pole double-throw (TPDT) switch that also switches the bypassing mechanism.

23. The power supply method of claim 15, wherein die switching mechanism is selected from the group consisting of mechanical switch, electromagnetic relay, field effect transistor (FET), integrated bipolar transistors (IGBTs) and intelligent integrated electronic circuit (IIEC).

24. The power supply method of claim 23, wherein the intelligent integrated electronic circuit (IIEC) senses voltage and current of the capacitor to trigger switches in the IIEC accordingly.

* * * * *